United States Patent
Mizuno

(10) Patent No.: US 10,127,413 B2
(45) Date of Patent: Nov. 13, 2018

(54) SENSOR MANAGEMENT SYSTEM

(71) Applicant: Yoshiro Mizuno, Tokyo (JP)

(72) Inventor: Yoshiro Mizuno, Tokyo (JP)

( * ) Notice: Subject to any disclaimer, the term of this patent is extended or adjusted under 35 U.S.C. 154(b) by 0 days.

(21) Appl. No.: 15/569,034

(22) PCT Filed: May 9, 2016

(86) PCT No.: PCT/JP2016/063793
§ 371 (c)(1),
(2) Date: Oct. 24, 2017

(87) PCT Pub. No.: WO2016/181944
PCT Pub. Date: Nov. 17, 2016

(65) Prior Publication Data
US 2018/0129835 A1 May 10, 2018

(30) Foreign Application Priority Data
May 12, 2015 (JP) .................. 2015-097040

(51) Int. Cl.
*G06K 7/10* (2006.01)
*G08B 5/22* (2006.01)
(Continued)

(52) U.S. Cl.
CPC ......... *G06K 7/10207* (2013.01); *G06K 7/089* (2013.01); *G06K 7/10128* (2013.01);
(Continued)

(58) Field of Classification Search
CPC .............. A61J 2200/30; A61J 2205/50; A61J 2205/60; A61J 7/0053; A61J 7/0418; A61J 7/0436; A61J 7/0445; A61J 7/0463; G06F 19/3462; G06K 19/0723; G06K 19/073; G06K 19/07345; G06K 19/07756; G06K 19/07762; G06K 19/07767; G06K 19/07783; G06K 7/0008; G06K 7/10029; G06K 7/10207; G06K 7/10277; G06Q 50/24; H04B 5/0062; G08C 17/00; H04W 12/06; H04W 4/04; H04W 84/10
See application file for complete search history.

(56) References Cited

U.S. PATENT DOCUMENTS

2007/0229278 A1* 10/2007 Nagata ............... G06K 19/0723
340/572.7
2010/0164742 A1 7/2010 Anderson
(Continued)

FOREIGN PATENT DOCUMENTS

| JP | 2006-195794 A | 7/2006 |
|---|---|---|
| JP | 2010-050909 A | 3/2010 |
| JP | 2011-253341 A | 12/2011 |

*Primary Examiner* — Dionne H Pendleton
(74) *Attorney, Agent, or Firm* — Enshan Hong; VLP Law Group LLP

(57) ABSTRACT

Provided is a system including, as components: a sensor node that includes a sensor unit including power supply means, an RFID tag, authentication means that performs authentication of a telegram written in the RFID tag, and stop instruction means that sends a stop command to the power supply means when the authentication fails, and that is enclosed in a weather-resistant case; and a user terminal that includes storage means in which the telegram is stored, and an RFID reader/writer.

3 Claims, 8 Drawing Sheets

(51) Int. Cl.
  *G06K 7/08* (2006.01)
  *G08C 17/00* (2006.01)
  *H04W 4/04* (2009.01)
  *H04W 12/06* (2009.01)
  *H04W 84/10* (2009.01)

(52) U.S. Cl.
  CPC ..... *G06K 7/10158* (2013.01); *G06K 7/10277* (2013.01); *G06K 7/10376* (2013.01); *G08C 17/00* (2013.01); *H04W 4/04* (2013.01); *H04W 12/06* (2013.01); *H04W 84/10* (2013.01)

(56) References Cited

U.S. PATENT DOCUMENTS

| | | | |
|---|---|---|---|
| 2011/0050400 A1* | 3/2011 | Ho | G06K 7/0008 340/10.42 |
| 2011/0298597 A1 | 12/2011 | Kaihori et al. | |
| 2012/0296674 A1* | 11/2012 | Ackerson | G06Q 50/24 705/3 |
| 2012/0306621 A1* | 12/2012 | Muthu | H05B 37/0272 340/8.1 |
| 2017/0098057 A1* | 4/2017 | Poutiatine | G06F 19/3462 |

\* cited by examiner

FIG. 6

| OBSERVATION TARGET | LOGIC ID | UNIQUE PHYSICAL ID |
|---|---|---|
| BACKYARD | R1 | U1 |
| GARAGE | R2 | U2 |

| TIME AND DATE | UNIQUE PHYSICAL ID | OBSERVATION VALUE |
|---|---|---|

| COMMAND ID | COMMAND |
|---|---|
| C1 | UPDATE REQUEST |
| C2 | SENSOR SETTING |
| C3 | SENSING DATA REQUEST |

8001, 8002, 8003, 8004, 8005

SENSOR MANAGEMENT SYSTEM

PRIORITY CLAIM

This is a U.S. national stage of application No. PCT/JP2016/063793, filed on May 9, 2016. Priority is claimed on the following applications: Country: Japan, Application No.: 2015-097040, Filed: May 12, 2015, the content of which is incorporated here by reference.

TECHNICAL FIELD

The present disclosure relates to systems that manage wireless sensors included in observation systems, and relates particularly to a system that manages a sensor enclosed in a sensor case.

BACKGROUND ART

Sensor nodes have been used in the state of being stored in sensor cases from the viewpoint of resistance to environments and prevention of malfunction by incorrect manipulation. Examples of operations for managing sensor nodes included in observation systems include operations in which direct manipulations are more convenient, such as on/off manipulations of the switches of arranged sensor nodes. Thus, access to electronic instruments included in the sensor nodes stored in the sensor cases has been problematic.

The operations have been executed by disposing switches in locations insusceptible to environments in the sensor cases, or by disposing switches with covers. However, measures with hardware are not ultimate solutions to the problems because of reducing environmental resistance and of causing a problem that the costs of sensor nodes are increased.

In addition, physical exchange operations have been needed by drains on the batteries of sensor nodes. There has been a problem that in an operation for transferring logic settings on an exchanged old sensor node to a new sensor node for which the exchange is performed, the correspondence relationships between IDs physically corresponding to the old and new sensor nodes and logical IDs identifying logical positions in a system may be set, thereby causing many errors.

CITATION LIST

Patent Literature

Patent Literature 1 provides a sensor node that autonomously sets an ID for start-up so as to prevent an overlap between the sensor nodes arranged in the range of propagation of a radio signal for start-up.

However, there have been a problem that it is impossible to make use of the intuitional properties of the sensor node being near at hand when the power supply of the sensor node near at hand is turned on in a site in which a target for measurement exists.

Patent Literature 1: Unexamined Japanese Patent Application Kokai Publication No. 2010-050909

SUMMARY OF INVENTION

Technical Problem

A problem to be solved of the present disclosure is to provide a system including a console function enabling a sensor node on an outer surface of which a switch and the like are absent to be manipulated without degrading environmental resistance while making use of the intuitional properties of an operator being immediately in front of the sensor node. A problem to be solved of the present disclosure is to also allow the system to have security enabling a sensor node to be manipulated to be appropriately selected by making use of the intuitional properties, and enabling incorrect manipulation to be prevented by allowing the system to operate only when authorized.

Solution to Problem

In a first aspect of the present disclosure, there is provided a system for managing a sensor node, the system including, as components:

a) a sensor node that includes a sensor unit including power supply means, an RFID tag, authentication means that performs authentication of a telegram written in the RFID tag, and stop instruction means that sends a stop command to the power supply means when the authentication fails, and that is enclosed in a weather-resistant case; and b) a user terminal that includes generation means that generates the telegram, and an RFID reader/writer, wherein the power supply means is started up and allowed to be in an ON state by power generated by the RFID tag due to proximity of the terminal, and is stopped and allowed to be in an OFF state by receiving the stop command.

Herein, the user terminal may further include update means that updates a setting on the old unique physical ID of the sensor node to a setting on a new unique physical ID, refer to the updated old unique physical ID acquired by the proximity to the old sensor node according to physical exchange of the sensor node, and the new unique physical ID, to which the update is performed, that is acquired by the proximity to the new sensor node according to the physical exchange, and transfer the logic ID of the old sensor node according to the physical exchange to the new sensor node by extracting a logic ID assigned to the old sensor node with the old unique physical ID as a key to re-assign the logic ID to the new unique physical ID to which the update is performed on a cloud server.

The user terminal may include at least one function selected from at least sensing data reference, change of a sampling interval, change of a communication interval, change of a measurement precision, change of a measurement range, change of a measurement type, and setting information display, for an operator's console according to the sensor node.

BRIEF DESCRIPTION OF DRAWINGS

FIG. 6 is a view illustrating the data structure of setting information stored in a setting information manager;

FIG. 7 is a view illustrating the data structure and data examples of sensing data stored in a sensing data manager;

FIG. 8 is a view illustrating operational commands stored in a storage in a portable communication terminal;

DESCRIPTION OF EMBODIMENTS

An embodiment for carrying out the present disclosure will be described below with reference to the drawings.

The operations or functions of a system described herein are achieved in cooperation with various implemented devices by allowing a processor with a predetermined circuit to execute control programs such as firmware incorporated in advance. Further, the programs are recorded on a non-transitory computer-readable recording medium, read from the non-transitory recording medium by the processor, and executed by user's manipulation or by sending and receiving a signal from a device included in the system.

Embodiment 1

Figure 1:
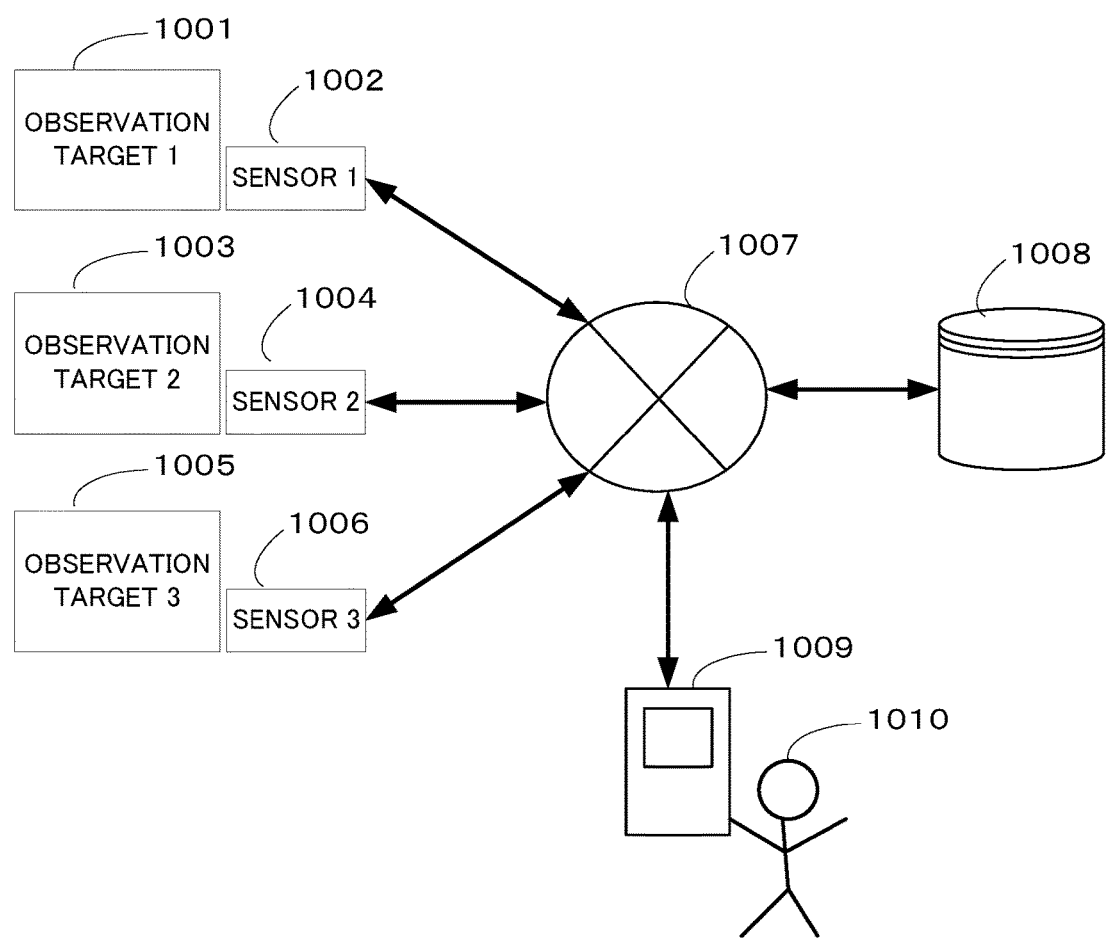
FIG. 1 is an overall view illustrating a sensor management system of Embodiment 1.

FIG. 1 is an overall view illustrating a sensor management system of Embodiment 1.

Sensor nodes are arranged on three observation targets, respectively, so that a first sensor node 1002 is arranged on a first observation target 1001, a second sensor node 1004 is arranged on a second observation target 1003, and a third sensor node 1006 is arranged on a third observation target 1005.

A cloud server 1008 can communicate and connect with each of the sensor nodes and a portable communication terminal 1009 which is a user terminal possessed by an operator 1010, via a communication line 1007. In such a case, an LTE line is adopted. However, communication lines that can be adopted in the present disclosure are not limited thereto, and the LTE line can be changed to a 3G line and the like as appropriate. In such a case, the system includes the three sensor nodes, the single cloud server, and the single portable communication terminal. The number and arrangement of sensor nodes that can be adopted in the present disclosure, and the numbers of cloud servers and portable communication terminals included in the system are not limited to those described herein. The numbers and the arrangement can be changed as appropriate according to a location and an objective to which the sensor management system is applied.

Figure 2:
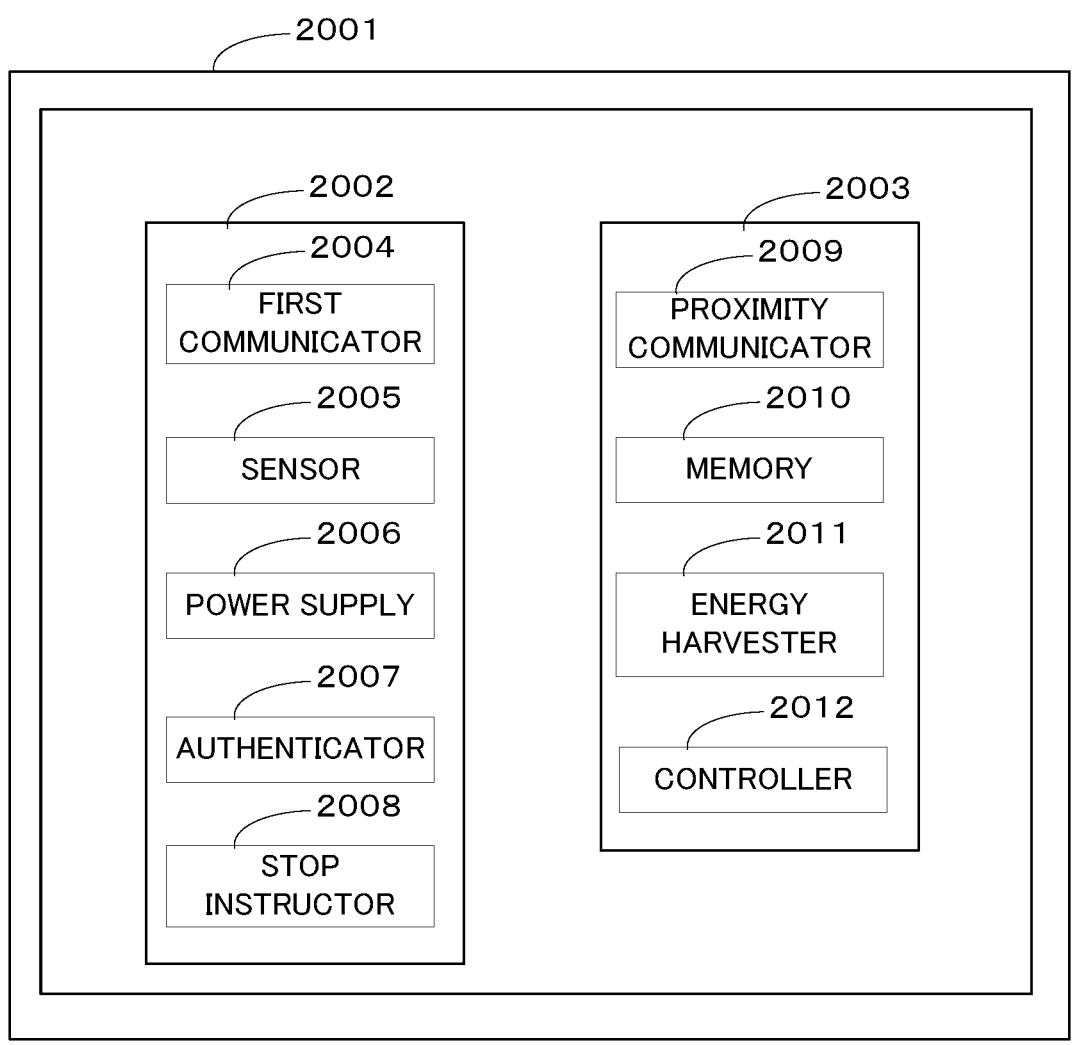
FIG. 2 is a block diagram illustrating the substrate and functional configurations of a sensor node.

(Sensor Node) FIG. 2 is a block diagram illustrating the substrate and functional configurations of the sensor node denoted by reference numeral 1002 in FIG. 1. The same applies to the functional configurations of the other sensor nodes denoted by reference numerals 1004 and 1006. A sensor substrate 2002 and an RFID tag substrate 2003 are enclosed in a weather-resistant case 2001.

The functional configuration of the sensor substrate 2002 is a functional configuration including: a first communicator 2004; a sensor 2005; a power supply 2006 including a latch circuit; an authenticator 2007 that performs authentication of a telegram written in a memory 2010 in the RFID tag substrate; and a stop instructor 2008 that sends a stop command to the power supply when the authentication performed by the authenticator fails.

The first communicator 2004 can communicate and connect with the cloud server 1008 via the communication line 1007. The sensor 2005 includes a temperature-humidity sensor that measures the temperature and humidity of an arranged observation target. However, a humidity sensor, an acceleration sensor, or the like can be adopted as appropriate according to the properties and objective of an observation target, in the system of the present disclosure.

In the power supply 2006, the latch circuit is allowed to be in an ON state by a signal transmitted from the RFID tag substrate when power is generated in an energy harvester 2011 in the RFID substrate 2003, while the latch circuit is allowed to be in an OFF state by a stop command when authentication fails. A common key for the sensor node is stored in the authenticator 2007, and authenticating is performed by verifying the common key against a common key included in a telegram.

The RFID tag substrate 2003 includes a functional configuration including: a proximity communicator 2009; the memory 2010 in which a unique physical ID is stored; the energy harvester 2011; and a controller 2012 that performs sending of the unique physical ID stored in the memory, writing in the memory 2010 from the outside, and the like. In such a case, an electromagnetic energy power generator is adopted as the energy harvester. Further, the authentication of the telegram in the authenticator 2007 is performed by a method of using a common key. However, the authentication of the present disclosure is not limited thereto, and can be changed to a method of using a public key, and the like as appropriate.

Figure 3:
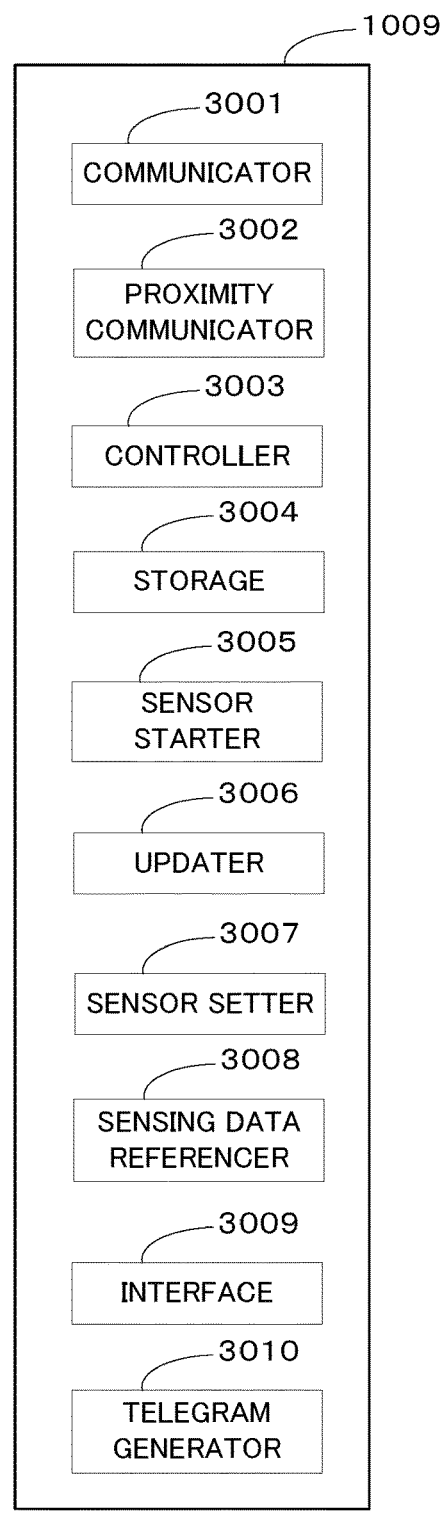
FIG. 3 is a block diagram illustrating a functional configuration according to the operation of a portable communication terminal in the present embodiment.

(Portable Communication Terminal) FIG. 3 is a block diagram illustrating a functional configuration according to the operation of the portable communication terminal 1009 in FIG. 1 in the present embodiment. The functional configuration includes functional configuration blocks including a communicator 3001, a proximity communicator 3002, a controller 3003, a storage 3004, a sensor starter 3005, an updater 3006, a sensor setter 3007, a sensing data referencer 3008, an interface 3009, and a telegram generator 3010. The communicator 3001 can communicate and connect with the cloud server via the communication line 1007.

The proximity communicator 3002 executes communication with a proximate RFID tag. The controller 3003 controls the operation of an RFID reader/writer according to an operation mode set by an operator or a manager. In such a case, reading of a unique physical ID, and writing of a telegram, an operational command, and the like in the memory 2010 in the RFID tag are executed. The telegram including the authentication information of the portable communication terminal, and an update command as an operational command are stored in the storage 3004.

The sensor starter 3005 operates to send a stop command through proximity communication when the authentication of the telegram fails. The updater 3006 sends the unique physical IDs of an updated old sensor node and a new sensor node to which the update is performed, acquired by proximity communication as described later, together with an update request command, to the cloud server 1008, to allow the cloud server 1008 to execute transfer of a logic ID on the cloud server.

The sensor setter 3007 generates a screen for inputting a change of the sampling interval, measurement precision, measurement range, or measurement type of a sensor node in proximity communication, receives an input from a user such as an operator to send a setting change command through proximity communication, and changes the settings of the sensor 2005 when the above-described authentication is established. In such a case, the changes of a sampling interval, a measurement precision, a measurement range, and a measurement type are adopted as the functions of the sensor setter. However, the functions of the sensor setter of the present disclosure are not limited thereto, and a change to the functions, such as addition of narrowing-down of functions or a change of a communication interval, can be made as appropriate.

Figure 12:
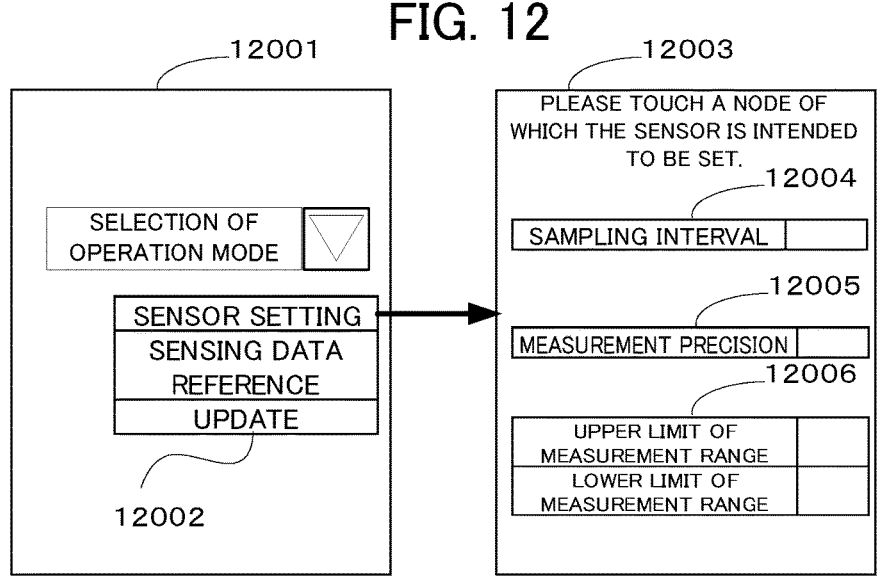
FIG. 12 is a diagram of a transition of a screen displayed on the interface of a portable communication terminal by the operation of a sensor setter.

FIG. 12 is a diagram of a transition of a screen displayed on the interface 3009 of the portable communication terminal by the operation of the sensor setter. A transition to a sensor setting screen 12003 is made when a user input selects a sensor setting from three modes displayed in a selection box 12002 in an operation mode selection screen 12001. In such a case, a sampling interval setting input field 12004, a measurement precision input field 12005, and a measurement range input field 12006 are displayed so that an input can be performed.

The present disclosure is not limited to the sensor settings described above. A change such as a change of a communication interval and a change and addition of the measurement type of a sensor can be made as appropriate.

Figure 13:
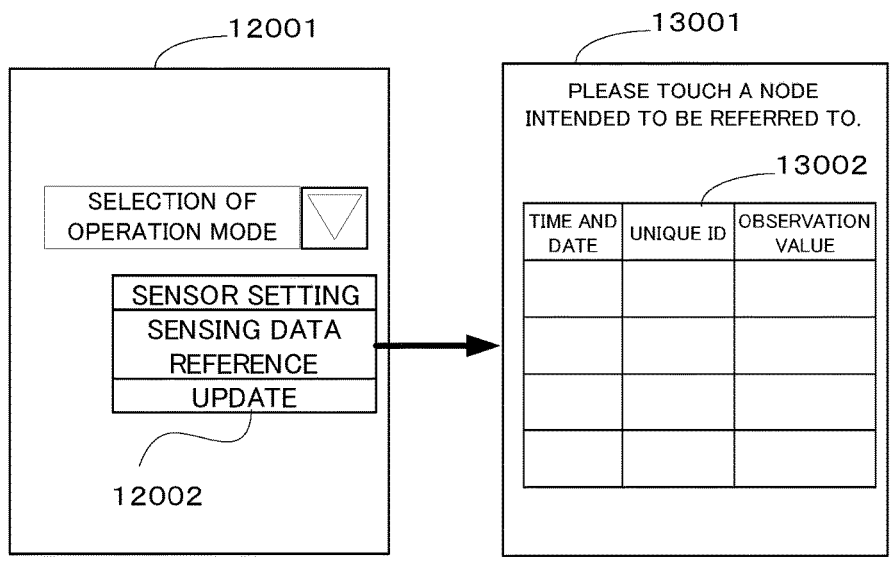
FIG. 13 is a diagram of a transition of a screen displayed on the interface of a portable communication terminal by a sensing data reference operation.

The sensing data referencer 3008 sends the unique physical ID of a sensor node, acquired through proximity communication, to the cloud server 1008, receives the sensing data of the sensor node from the cloud server, and displays the sensing data on the interface 3009 of the portable communication terminal. FIG. 13 is a diagram of a transition of a screen displayed on the interface 3009 of the portable communication terminal by a sensing data reference operation. A transition to a sensor setting screen 13001 is made when a user input selects sensing data reference from the three modes displayed in the selection box 12002 in the operation mode selection screen 12001. In such a case, a viewing screen 13002 in the form of a time and date, a unique physical ID, and an observation value is generated and displayed. The present disclosure is not limited to the sensing data reference described above. The form of the display, and the like can be changed as appropriate.

When system operation is started, or access from the cloud server is made due to change of an authentication information update described later, or the like, the telegram generator 3010 generates a telegram including the common key described above, and stores the telegram in the storage 3004.

Figures 4, 5:
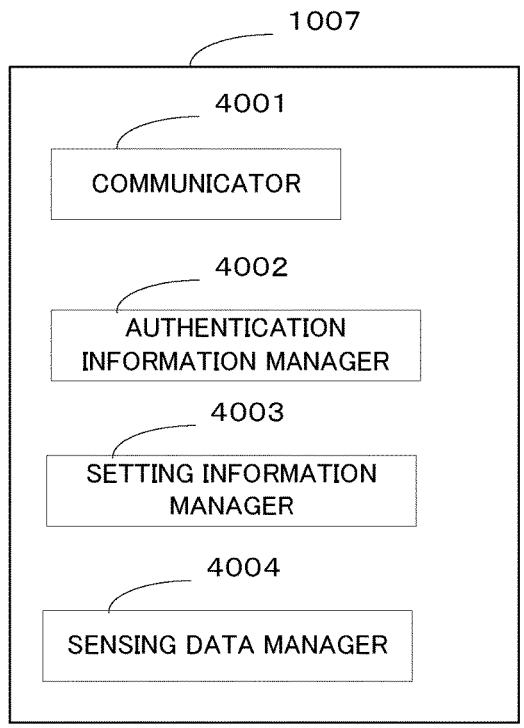
FIG. 4 is a block diagram illustrating a functional configuration according to the operation of a cloud server.
FIG. 5 is a view illustrating the data structure and data examples of authentication information stored in an authentication information manager.

(Cloud Server) FIG. 4 is a block diagram illustrating a functional configuration according to the operation of the cloud server 1008 in the present embodiment. Functional configuration blocks including a communicator 4001, an authentication information manager 4002, a setting information manager 4003, and a sensing data manager 4004 are included. The communicator 4001 can communicate and connect with the sensor nodes and the portable communication terminal via the communication line 1007.

The common keys of the sensor nodes that can be manipulated according to each portable communication terminal are stored in and managed by the authentication information manager 4002. In such a case, the authentication information manager 4002 is set to access the portable communication terminal 1009 from the cloud server and to update a telegram stored in the storage 3004 when a change such as an update of authentication information is made. FIG. 5 is a view illustrating the data structure and data examples of authentication information stored in the authentication information manager 4002. The structure includes a terminal ID 5001 for identifying a portable communication terminal and the common key 5002 of the sensor nodes that can be manipulated by the portable communication terminal having the terminal ID.

A data example 5003 shows that the number of sensor nodes that can be manipulated by a portable communication terminal having a terminal ID of T1 are three, and common keys corresponding to the sensor nodes are K1, K2, and K7. Similarly, reference numeral 5004 shows that a common key corresponding to a sensor node that can be manipulated by a portable communication terminal having a terminal ID of T2 is denoted by K3, and the number of the common key is one. Reference numeral 5005 shows that the number of sensor nodes that can be manipulated by a portable communication terminal having a terminal ID of T3 is three, and common keys corresponding to the sensor nodes are K4, K5, and K6. In such a case, K1, K2, K3, K4, K5, K6, and K7 are the common keys of the sensor nodes having unique physical IDs of U1, U2, U3, U4, U5, U6, and U7.

Setting information such as a logic ID for identifying a logical position in the system for managing a sensor node is stored in and managed by the setting information manager 4003. The setting information is disposed to be able to be updated from a site in which a sensor node is physically arranged, as described later, by an update request command sent from a portable communication terminal.

FIG. 6 is a view illustrating the data structure of the setting information stored in the setting information manager 4003. The structure includes the name 6001 of a target to be observed by a sensor node, a logic ID 6002 for identifying the logical position of the observation target, and a unique physical ID 6003 stored in the RFID tag of the sensor node. A data example 6004 represents the setting information of "backyard", and a data example 6005 represents the setting information of "garage".

Sensing data observed by a sensor node is stored in the sensing data manager 4004 on a time-series basis, and managed by the sensing data manager 4004. FIG. 7 is a view illustrating the data structure and data examples of the sensing data stored in the sensing data manager 4004. The structure includes a time and date 7001 representing an observation time, a unique physical ID 7002 for identifying a sensor node, and an observation value 7003 measured by the sensor of the sensor node.

FIG. 8 is a view illustrating operational commands stored in the storage 3004 in the portable communication terminal. The structure includes a command ID 8001 for identifying the type of a command and a command 8002 adopted in the present embodiment. The types of commands adopted in such a case are an update request command 8003, a sensor setting command 8004, and a sensing data request command 8005.

The update request command 8003 is sent, together with the acquired unique physical IDs of the updated old sensor node and the new sensor node to which the update is performed, to the cloud server 1008 via the communication line 1007 when the portable communication terminal operates in an update mode described later. The sensor setting command 8004 is sent, together with a setting change information communication input by an operator or the like, to the sensor of a sensor node in proximity communication through an RFID function. The sensing data request command 8005 is sent, together with the unique physical ID of the sensor node, acquired in proximity communication, to the cloud server 1008 via the communication line 1007.

Figure 9:
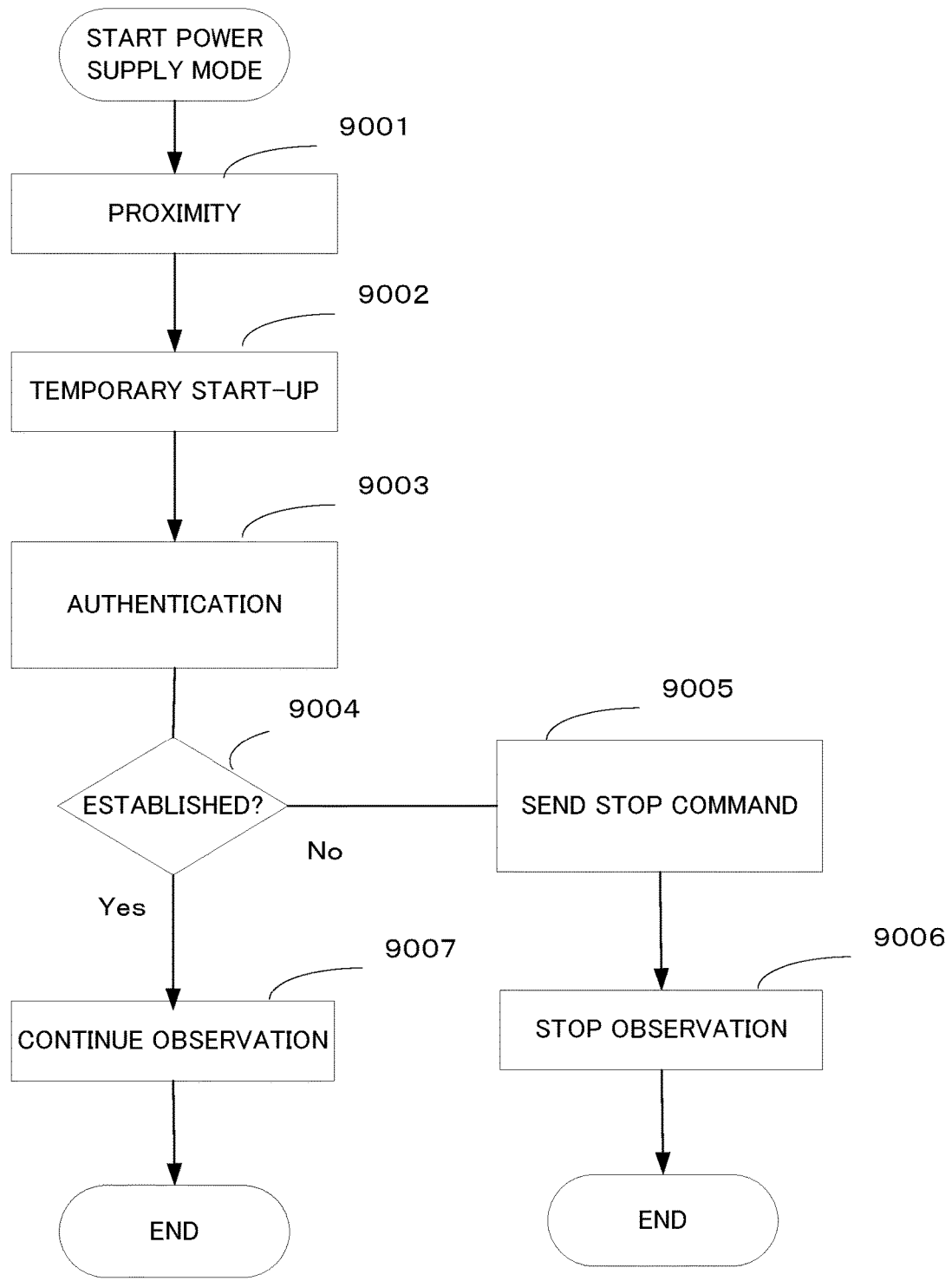
FIG. 9 is a flowchart illustrating the operations of the present embodiment in a power supply mode.

(Flow of Turning-on of Power Supply) FIG. 9 is a flowchart illustrating the operation of the present embodiment in a power supply mode. The power supply mode is a mode for performing an operation for turning on a power supply for starting the observation operation of a sensor node stopping in shipment or the like. The operation mode of the portable communication terminal is started as the power supply mode by the predetermined manipulation of an operator.

In proximity step 9001, the operator 1010 gently touches a sensor node for which a power supply is intended to be turned on, with the portable communication terminal 1009. As a result, the RFID tag substrate 2003 is started up, and a start-up signal is sent to the sensor substrate 2001. In temporary start-up step 9002, the latch circuit of the power supply 2006 is allowed to be in an ON state by the start-up signal from the RFID tag substrate. As a result, power is supplied to the sensor substrate, and the sensor node starts observation.

In authentication step 9003, the telegram written in the memory 2010 by the RFID reader/writer of the portable communication terminal through the RFID function is authenticated by the authenticator 2007 of the sensor substrate. The authentication of the telegram is carried out based on whether common keys which are authentication information included in the telegram matches the common key of the sensor node.

In such a case, the telegram including the common keys corresponding to sensor nodes that can be manipulated by the portable communication terminal is generated in the portable communication terminal, and the authentication is established when any of the common keys included in the telegram corresponds to the sensor node. For example, in the case of the communication terminal "T1" of the data example 5003 illustrated in FIG. 5, the authentication is established when the common key of the sensor node is any of K1, K2, and K7.

In such a case, the authentication is carried out by verifying the common keys included in the telegram against the common key of the sensor node. However, authentication that can be adopted in present disclosure is not limited thereto. For example, a system such as a public key system can be adopted as appropriate.

When it is determined that the authentication fails in determination step 9004, the operation of the system goes to stop command sending step 9005. In stop command sending step 9005, a stop command is sent from the stop instructor 2008 of the sensor substrate to the power supply 2006.

In observation stopping step 9006, the power supply 2006 that has received the stop command allows the latch circuit to be in an OFF state, and stops observation activity. In contrast, when it is determined that the authentication is established in determination step 9005, the operation of the system goes to observation continuation step 9007, and the observation activity of the sensor node that has temporarily started up is continued.

An operation in such a power supply mode enables a power switch function that accurately operates only for a sensor node intended to be started up while reducing, to a low level, a communication traffic volume required for starting up the sensor node, to be provided at a low cost.

Figure 10:
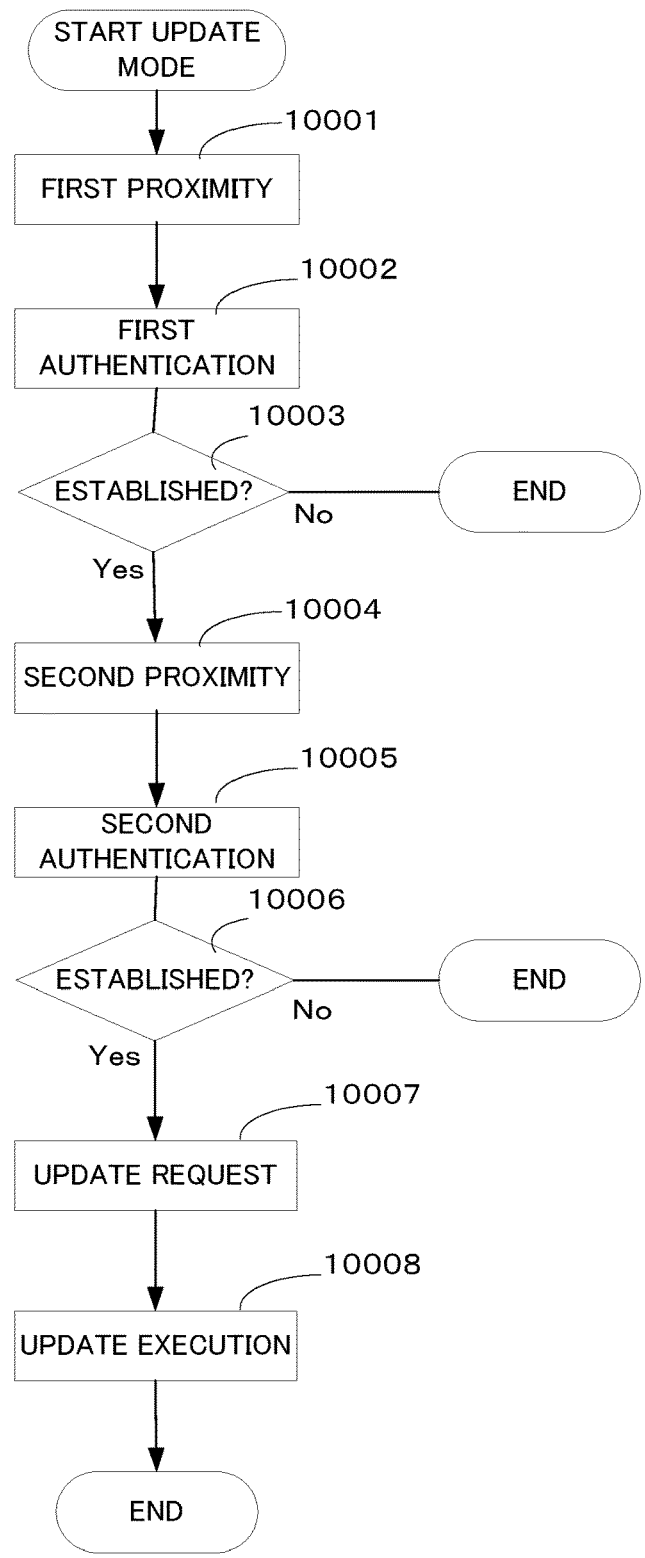
FIG. 10 is a flowchart illustrating the operations of the present embodiment in an update mode.

(Flow of Update) FIG. 10 is a flowchart illustrating the operations of the present embodiment in an update mode. The update mode is a mode of performing an operation of transferring the logical settings of an old sensor node to a new sensor node in accordance with physical operation when the sensor node deteriorated due to battery drain or the like is exchanged physically. The operation mode of the portable communication terminal is started as the update mode by predetermined manipulation by the operator.

In such a case, the update mode is started by displaying the operation mode selection screen 12001 described above and illustrated in FIG. 12 and selecting an update from the three modes displayed in the selection box 12002 by manipulation by the operator.

In first proximity step 10001, the operator 1010 gently touches the exchanged old sensor node with the portable communication terminal 1009. At this time, the portable communication terminal acquires the unique physical ID of the old sensor node through the RFID function. In first authentication step 10002, the telegram of the portable communication terminal, written in the memory 2010 through the RFID function, is authenticated by the authenticator 2007.

The system operation ends when it is determined that the authentication fails in determination step 10003. The operation of the system continues and waits for second proximity step when it is determined that the authentication is established in determination step 10003.

In second proximity step 10004, the operator 1010 gently touches the new sensor node for which the exchange is performed, with the portable communication terminal 1009. At this time, the portable communication terminal acquires the unique physical ID of the new sensor node through the RFID function. In second authentication step 10005, the telegram of the portable communication terminal, written in the memory 2010 through the RFID function, is authenticated by the authenticator 2007.

The system operation ends when it is determined that the authentication fails in determination step 10006. The operation of the system goes to update request step 10007 when it is determined that the authentication is established in determination step 10006.

In update request step 10007, an update request command is sent, together with the unique physical ID of the old sensor node and the unique physical ID of the new sensor node, from the portable communication terminal to the cloud server via the communication line 1007. In update execution step 10008, an update of assigning the new sensor node with the logic ID assigned to the old sensor node according to the received update request command is executed in the cloud server.

Figure 11:
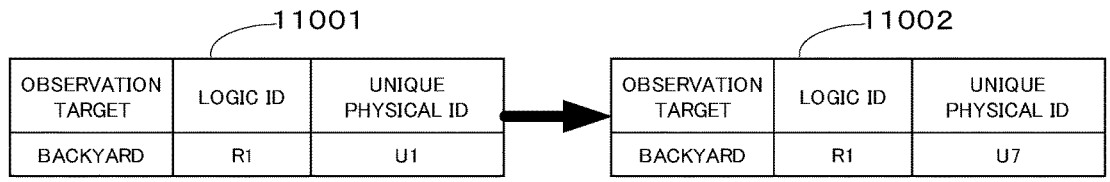
FIG. 11 is a block diagram illustrating logic settings before and after an update.

FIG. 11 is a block diagram illustrating logic settings before and after the update. In such a case, an example of physical exchange of a sensor node targeted for observation of "backyard" is illustrated. In a logic setting 11001 before the update, a logic ID "R1" has been assigned to an old sensor node having a unique physical ID "U1". In a logic setting 11002 after the update, a logic ID "R1" is assigned to a new sensor node having a unique physical ID "U7".

As a result, the logic settings such as the communication settings of the old sensor node, and a location in which observational data is stored are transferred to the new sensor node. The adoption of such an update method enables the complicated update of logic settings to be executed by intuitive manipulation as the proximity of a user terminal and old and new sensor nodes, and enables the update of the logic settings, associated with physical exchange of a sensor node, to be easily and reliably carried out.

Example embodiments disclosed herein are to be regarded in an illustrative rather than a restrictive sense in all respects.

The scope of the invention is defined only by the included claims rather than the foregoing discussion, and intended to encompass all changes within the meaning and scope of equivalents to which such claims are entitled.

The present application claims priority based on Japanese Patent Application No. 2015-097040, and the entire content of the basic application is incorporated herein.

INDUSTRIAL APPLICABILITY

The present disclosure can be applied to industries such as the field of weather observation, the field of agriculture, and the field of warehousing management, in which sensor networks are used.

REFERENCE SIGNS LIST

1001 First observation target
1002 First sensor node
1003 Second observation target
1004 Second sensor node
1005 Third observation target
1006 Third sensor node
1007 Communication line
1008 Cloud server
1009 Portable communication terminal

The invention claimed is:

1. A system for managing a sensor node, the system comprising, as components:
   a) a sensor node that comprises a sensor unit comprising a power supply to supply power to the sensor node, an RFID tag, an authenticator to perform authentication of a user terminal based on a telegram written in the RFID tag, and a stop instructor that sends a stop command to the power supply when the authentication fails, and that is enclosed in a weather-resistant case; and
   b) the user terminal that comprises a generator to generate the telegram that includes the authentication information of the user terminal, and an RFID reader/writer,
   wherein the power supply is started up and allowed to be in an ON state by power generated by the RFID tag due to proximity of the user terminal and is stopped and allowed to be in an OFF state by receiving the stop command.

2. The system according to claim 1, wherein
the user terminal further comprises an updater to update a setting on an old unique physical ID of the sensor node to a setting on a new unique physical ID,
refers to the updated old unique physical ID acquired by the proximity to an old sensor node according to physical exchange of the sensor node, and the new unique physical ID, to which the update is performed, that is acquired by the proximity to a new sensor node according to the physical exchange, and
transfers a logic ID of the old sensor node according to the physical exchange to the new sensor node by re-assigning a logic ID assigned to the old sensor node to the unique physical ID to which the update is performed on a cloud server.

3. The system according to claim 1, wherein the user terminal comprises at least one function selected from sensing data display, change of a sampling interval, change of a measurement precision, change of a measurement type, and setting information display, for an operator's console according to the sensor node.

* * * * *